(12) United States Patent
Lee et al.

(10) Patent No.: US 9,054,543 B2
(45) Date of Patent: Jun. 9, 2015

(54) LATCHING RELAY CONTROL CIRCUITRY

(75) Inventors: Garland Lee, Windsor, CO (US); Sam Babb, Fort Collins, CO (US); Eugene Dvoskin, Broomfield, CO (US); John Spencer, Fort Collins, CO (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 883 days.

(21) Appl. No.: 13/260,422

(22) PCT Filed: Jul. 21, 2009

(86) PCT No.: PCT/US2009/051277
§ 371 (c)(1),
(2), (4) Date: Sep. 26, 2011

(87) PCT Pub. No.: WO2011/010996
PCT Pub. Date: Jan. 27, 2011

(65) Prior Publication Data
US 2012/0032529 A1    Feb. 9, 2012

(51) Int. Cl.
| H01H 9/54 | (2006.01) |
| H02J 9/00 | (2006.01) |
| G06F 1/26 | (2006.01) |
| G06F 1/32 | (2006.01) |
| H02H 9/00 | (2006.01) |
| H02H 9/02 | (2006.01) |

(52) U.S. Cl.
CPC ............... *H02J 9/005* (2013.01); *H02H 9/001* (2013.01); *H02H 9/002* (2013.01); *H02H 9/026* (2013.01); *G06F 1/26* (2013.01); *G06F 1/3203* (2013.01)

(58) Field of Classification Search
CPC ........................................................ H02J 9/005
USPC ............................... 307/140; 361/13, 18, 165
See application file for complete search history.

(56) References Cited

U.S. PATENT DOCUMENTS

| 6,075,378 | A | 6/2000 | Okamura |
| 6,415,387 | B1 | 7/2002 | Aguilar et al. |
| 6,489,725 | B1 | 12/2002 | Suzuki et al. |
| 2003/0063418 | A1 | 4/2003 | Bergh et al. |
| 2005/0270717 | A1 | 12/2005 | Zipagan |
| 2008/0278878 | A1 | 11/2008 | Shin |
| 2009/0059458 | A1 | 3/2009 | Xu |
| 2010/0314951 | A1* | 12/2010 | DuBose et al. ............... 307/126 |
| 2013/0077198 | A1* | 3/2013 | Divan .............................. 361/56 |

FOREIGN PATENT DOCUMENTS

| CN | 201197133 | 2/2009 |
| JP | 54-130873 | 10/1979 |
| JP | 2006179232 | 7/2006 |

* cited by examiner

*Primary Examiner* — Daniel Cavallari
(74) *Attorney, Agent, or Firm* — Hewlett-Packard Patent Department

(57) ABSTRACT

Electronic circuits and methods are provided for power conservation applications. A latching relay includes a controlled switch electrically coupled within a power supply of a computer or other load. Circuitry of the present teachings controls operation of the latching relay. Set and reset conditions of the latching relay establish normal and deep standby operating modes for the computer, respectively. Manual switching or automated signaling are used to assert the set and reset relay conditions. Very low power consumption is achieved during the deep standby mode of operation.

15 Claims, 3 Drawing Sheets

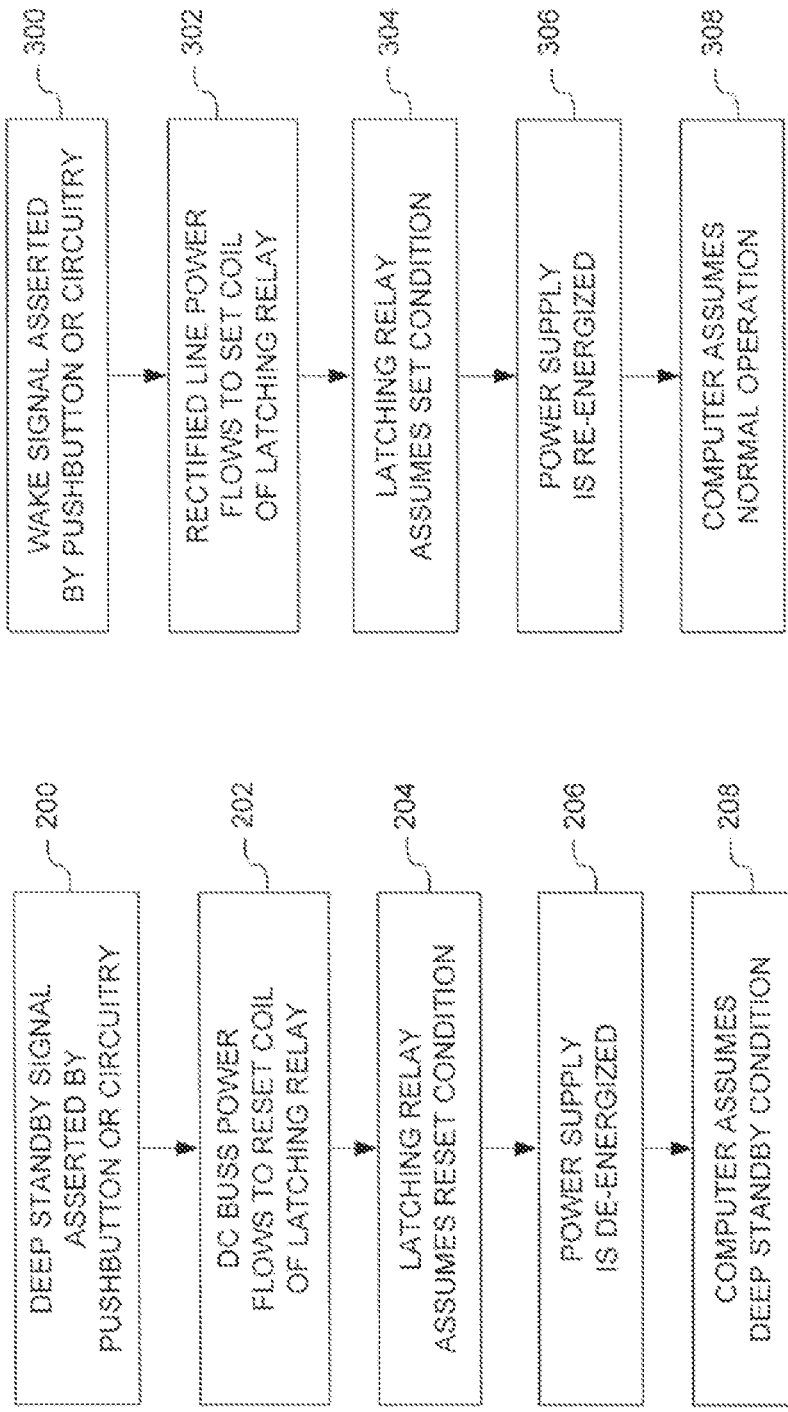

LATCHING RELAY CONTROL CIRCUITRY

BACKGROUND

Numerous desktop computers and other devices are designed to assume one or more types of low power-consumption mode during non-use or other idle periods. Applicable laws and regulations in this area are becoming more stringent as the need to conserve resources is recognized as essential to a sustainable global community. However, many existing power supplies and other circuit designs cannot conform to present or pending power conservation directives. The present teachings address the foregoing concerns.

BRIEF DESCRIPTION OF THE DRAWINGS

The present embodiments will now be described, by way of example, with reference to the accompanying drawings, in which:

FIG. 2 is a flow diagram depicting a method according to one embodiment;

FIG. 3 is a flow diagram depicting a method according to one embodiment;

DETAILED DESCRIPTION

Introduction

Means and methods for conserving power are provided by the present teachings. A latching relay includes a controlled switch that is electrically coupled within a power supply of a computer or other load. Circuitry controls operation of the latching relay. Set and reset conditions of the latching relay correspond to normal and "deep standby" operating modes for the computer, respectively. Manual switching or automated signaling are used to establish set and reset conditions for the latching relay. Very low power consumption is achieved during the deep standby mode of operation.

In one embodiment, an electronic circuit includes a latching relay including a set coil and a reset coil and a switch. The switch has a first end node and a second end node. The electronic circuit also includes a first capacitor electrically coupled to the first end node of the switch. The electronic circuit also includes a second capacitor electrically coupled to the second end node of the switch. The electronic circuitry further includes a rectifier configured to receive electrical current by way of the first and second capacitors. The rectifier is also configured to provide an electrical potential between a first output node and a second output node while the latching relay is in a reset condition.

In another embodiment, a method includes coupling electrical potential between respective end nodes of a switch to a rectifier by way of a pair of capacitors. The switch is in an open state, and the switch is part of a latching relay. The method also includes outputting an electrical potential between a, pair of output nodes of the rectifier. The method also includes coupling electrical current from the pair of output nodes to a set coil of the latching relay. The method further includes closing the switch by way of the set coil.

First Illustrative Embodiment

Figure 1:
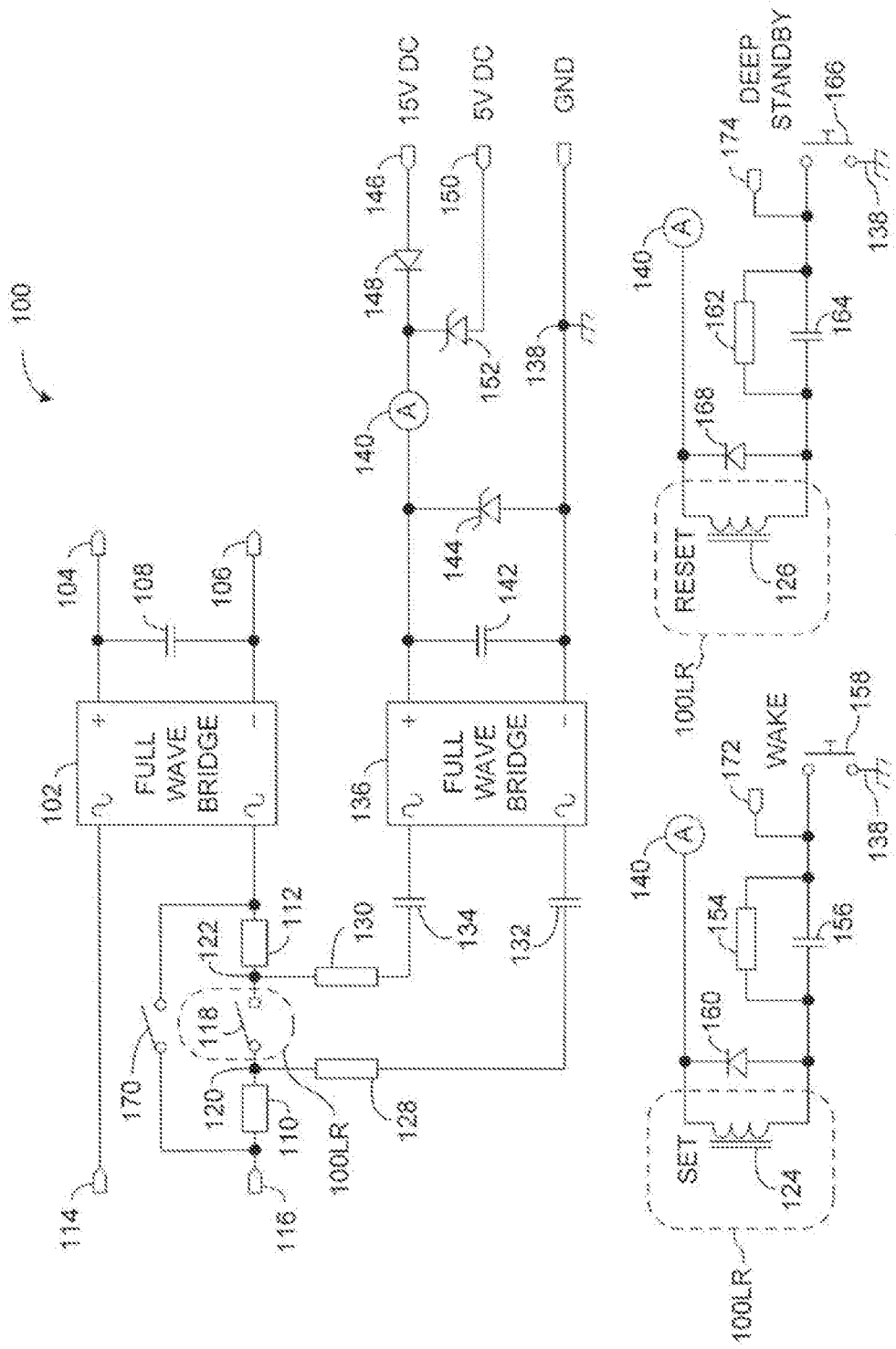
FIG. 1 depicts a schematic diagram of electronic circuitry according to one embodiment.

Reference is now directed to FIG. 1, which depicts a schematic diagram of electronic circuitry 100. The circuitry 100 is illustrative and non-limiting with respect to the present teachings. Thus, other circuits and embodiments can be configured and/or operated in accordance with the present teachings.

The circuitry 100 includes a rectifier 102 configured to perform full wave rectification of input alternating-current (AC) electrical power. The rectifier 102 can be defined by a plurality of discrete diodes, as an integrated rectifier device, or by other suitable means. The rectifier 102 outputs pulsating direct-current (DC) electrical power between a pair of nodes 104 and 106. The circuitry 100 also includes a filter capacitor 108 coupled between the nodes 104 and 106.

The circuitry 100 further includes a pair of negative temperature coefficient (NTC) thermistors 110 and 112, respectively. Each of the thermistors 110 and 112 is configured to limit inrush current to the rectifier 102 and other elements of the circuitry 100. The rectifier 102 is coupled to a first power input node 114, and to a second power input node 116 by way of the pair of thermistors 110 and 112. The circuitry 100 also includes a controlled switch (i.e., relay contacts) 170 that are closed after an inrush current event. The switch 170 is controlled by a relay of the circuitry that is not shown and is not relevant to an understanding of the present teachings.

It is noted that the rectifier 102, the capacitor 108, the respective thermistors 110 and 112 and the switch 170 are a part of a switching power supply. One illustrative and non-limiting example of such a power supply is model DPS-1050DB A, available from Delta Electronics, Inc., Fremont, Calif., USA. Circuitry according to the present teachings is discussed hereinafter.

The circuitry 100 also includes a latching relay 100LR having a controllable switch (or pair of contacts) 118. In one illustrative embodiment, the latching relay 100LR is defined by a model RT314F12, available from Schrack Technik International, Vienna, Austria. Other suitable latching relays can also be used. The switch 118 is defined by a pair of end nodes 120 and 122. The switch 118 is controlled so as to be set (i.e., electrically closed) by way of a set coil 124, and reset (i.e., electrically opened) by way of a reset coil 126, of the latching relay 100LR. In this way, the switch 118 is configured to assume and hold either a set (closed) or reset (open) condition in accordance with the most recently energized coil (set coil 124 or reset coil 126, respectively). Electrical energy within the power supply is directly connected between the end nodes 120 and 122 when the switch 118 is closed.

The circuitry 100 also includes a resistor 128 connected to the end node 120, and a resistor 130 connected to the end node 122. The circuitry also includes a capacitor 132 connected to the resistor 128, and a capacitor 134 connected to the resistor 130. In this way, the resistors 128 and 130 and the capacitors 132 and 134 define a pair of respective series-connected electrical circuit paths. The capacitors 132 and 134 are also referred to as energy coupling capacitors for purposes herein. In one embodiment, each of the capacitors 132 and 134 is defined by a model CD16E2GA472MYNS, available from TDK Corporation of America, Mount Prospect, Ill., USA. Other suitable capacitors can also be used.

The circuitry 100 includes a rectifier 136 configured to perform full wave rectification of input alternating-current (AC) electrical power. The rectifier 136 can be defined by a plurality of discrete diodes, as an integrated rectifier device, or other suitable means. The rectifier 136 is coupled to receive electrical power from the end nodes 120 and 122 of switch 118 by way of the resistors 128-130 and the capacitors 132-134. The rectifier 136 is configured to output pulsating direct-current energy between a negative (or ground) node 138 and a positive node 140.

The circuitry 100 also includes a filter capacitor 142 and a zener diode 144 coupled between the respective nodes 138 and 140. The filter capacitor 142 operates to filter or smooth the pulsating DC electrical output from the rectifier 136 and provides energy storage necessary to change the latching relay 100LR to a set or reset state, while the zener diode 144 operates to regulate the direct-current voltage between the nodes 138 and 140.

Node 140 of the circuitry 100 is connected to a source of fifteen volts direct-current at a node 146 by way of a steering diode 148. Additionally, node 140 of the circuitry 100 is connected to a source of five volts direct-current at a node 150 by way of a zener diode 152, which is intended to provide such five volts when the computing system is in the deep standby state. The respective voltages at nodes 146 and 150 are typically provided by a power supply (e.g., model DPS-1050DB as cited above, etc.). The ground node 138 is connected to ground potential.

The set coil 124 of the latching relay 100LR is coupled to receive electrical energy from the positive node 140, and ground potential at node 138 by way of a resistor 154 and a capacitor 156 when a normally-open momentary switch 158 is manually actuated. The switch 158 is depicted as a normally-open momentary pushbutton type. However, other types of switches or control methods can also be used. Alternatively, the set coil 124 can receive a ground-potential "WAKE" signal at a node 172. A diode 160 protects the circuitry 100 against excessive transient voltages induced in the set coil 124 during opening of the switch 158.

The reset coil 126 of the latching relay 100LR is coupled to receive electrical energy from the positive node 140, and ground potential at node 138 by way of a resistor 162 and a capacitor 164 when a normally-open momentary switch 166 is manually actuated. The switch 166 is depicted as a normally-open momentary pushbutton type. However, other types of switches or control methods can also be used. In the alternative, the reset coil 126 can receive a ground-potential "DEEP STANDBY" signal at a node 174. A diode 168 protects the circuitry 100 against excessive transient voltages induced in the reset coil 126 during opening of the switch 166.

Relay contacts 170 are part of an inrush current-control relay of the circuitry 100 and are configured to electrically short around the thermistors 110 and 112 and the switch 118 when the power supply is enabled to output power to all loads, which occurs during power supply startup.

Normal operations of the circuitry 100 are described hereinafter. Table 1 below provides illustrative and non-limiting values for elements and components of the circuitry 100 that are germane to the present teachings:

TABLE 1

Circuitry 100

| Element/Device | Value/Model | Notes/Vendor |
| --- | --- | --- |
| Latch Relay 100LR | RT314F12 | Schrack Technik Int'l |
| Resistor 128 | 100 Ohms | (any) |
| Resistor 130 | 100 Ohms | (any) |
| Capacitor 132 | 4.7 nF/See text | >=2500 WV/TDK Corp. |
| Capacitor 134 | 4.7 nF/See text | >=2500 WV/TDK Corp. |
| Rectifier 136 | KBU8K | General Semiconductor |
| Capacitor 142 | 3 each at 22 uF | >=15 VDC/low leakage |
| Zener Diode 144 | 1N4744A/15 V | Fairchild Semiconductor |
| Diode 148 | T1N4007 | (any) |
| Zener Diode 152 | 1N4740A/10 V | Fairchild Semiconductor |
| Resistor 154 | 10K Ohms | (any) |
| Capacitor 156 | 2 each at 22 uF | >=15 VDC |
| Switch 158 | N.O. Momentary | (any) |

TABLE 1-continued

Circuitry 100

| Element/Device | Value/Model | Notes/Vendor |
| --- | --- | --- |
| Diode 160 | 1N4148 | (any) |
| Resistor 162 | 10K Ohms | (any) |
| Capacitor 164 | 2 each at 22 uF | >=15 VDC |
| Switch 166 | N.O. Momentary | (any) |
| Diode 168 | 1N4148 | (any) |

First Illustrative Method

FIG. 2 is a flow diagram depicting a method according to tone embodiment of the present teachings. The method of FIG. 2 includes particular operations and order of execution. However, other methods including other operations, omitting one or more of the depicted operations, and/or proceeding in other orders of execution can also be used according to the present teachings. Thus, the method of FIG. 2 is illustrative and non-limiting in nature. Reference is also made to FIG. 1 in the interest of understanding the method of FIG. 2.

At 200, a "DEEP STANDBY" signal is asserted by way of a user momentarily pressing a "deep standby" pushbutton, or by the automatic issuance of a deep standby signal. This signal is provided so as to place a computer or other load device into a deep standby, power-conserving mode of operation. For purposes of illustration and test, it is understood that a user presses the deep standby pushbutton switch 166 of the circuitry 100.

At 202, direct-current electricity from at least one power buss flows through the reset coil of a latching relay. For purposes of the ongoing example, fifteen volts electrical energy at node 146, which is provided by an operating power supply, is coupled such that electrical current flows through the reset coil 126 by way of node 140 and switch 166.

At 204, the latching relay assumes a reset condition as a result of the steps 200 and 202 above. For purposes of example, the controlled switch 118 of the latching relay 100LR assumes an electrically open or "reset" condition. The open condition of the switch 118 is maintained until such time as a normal "set" operation is performed.

At 206, the power supply is de-energized. For purposes of example, it is understood that the power supply is de-energized (source power is effectively removed) as a result of the opening of the switch 118 of the latching relay 100LR, and by independent control of relay contacts 170 of the inrush current control relay of circuitry 100.

At 208, a computer or other load device assumes a deep standby condition. For purposes of the example, it is understood that the de-energized power supply results in minimal power consumption by the computer (or other load).

The foregoing method is illustrative of any number of methods contemplated by the present teachings. In general, and without limitation, a user presses a pushbutton or otherwise actuates a manual switch, or a deep standby signal is asserted by a computer or other device. Electrical current from an operating power supply is coupled by circuitry to a reset coil of a latching relay, resulting in the opening of controlled electrical contacts. Electrical power is thus disconnected within the power supply circuitry and the power supply is effectively shut down. A computer or other load that receives electrical power from the power supply is placed in a deep standby, power conservation mode of operation.

It is noted that the inrush relay switch 170 effectively shorts out the switch 118 during normal, full-power operation. As a result, the latching relay 100LR can be reset for deep standby operations while the switch 170 is electrically closed without affecting normal operations of a computer or other load device. Under such a scenario, the computer (or other load) can assume some other power conservation state (e.g., S4 or S5 "sleep" mode, etc.) and the latching relay 100LR will already be in a reset condition.

Second Illustrative Method

FIG. 3 is a flow diagram depicting a method according to one embodiment of the present teachings. The method of FIG. 3 includes particular operations and order of execution. However, other methods including other operations, omitting one or more of the depicted operations, and/or proceeding in other orders of execution can also be used according to the present teachings. Thus, the method of FIG. 3 is illustrative and non-limiting in nature. Reference is also made to FIG. 1 in the interest of understanding the method of FIG. 3.

At 300, a "WAKE signal is asserted by way of a user momentarily pressing a wake" pushbutton, or by the automatic issuance of a "wake" signal. This signal is provided so as to return a computer (or other load device) from a deep standby mode to a state of normal operations. For purposes of non-limiting illustration, it is understood that a user presses the "wake" pushbutton switch 158 of the circuitry 100.

At 302, rectified electricity from a line (i.e., utility) source is coupled to flow through the set coil of a latching relay. For purposes of the ongoing example, it is understood that electrical potential between end nodes 120 and 122 of the switch 118 (which is in an open condition) is coupled to the set coil 124 of the circuit 100 by way of node 140. Resistors 128-130, capacitors 132-134 and rectifier 136 define a part of the circuit path that provides the electrical current to the set coil 124.

At 304, the latching relay assumes a set condition as a result of the steps 300 and 302 above. For purposes of example, the controlled switch 118 of the latching relay 100LR assumes an electrically closed or "set" state, followed thereafter by a closed condition of the switch 170 (under independent control). The closed condition of the switch 118 is maintained until such time as a normal "reset" operation is performed.

At 306, the power supply is re-energized. For purposes of example, it is understood that a power supply is re-coupled to line power as a result of the closing of the switch 118 of the latching relay 100LR.

At 308, a computer or other load device assumes a normal operating condition. For purposes of the example, it is understood that the re-energized power supply results in normal operation by the computer (or other load).

The foregoing method is illustrative of any number of methods contemplated by the present teachings. In general, and without limitation, a user presses a pushbutton or otherwise actuates a manual switch, or a wake signal is asserted by a computer or other device. Electrical current from line sources is coupled by circuitry to a set coil of a latching relay, resulting in the closing of controlled electrical contacts. Electrical source power is thus coupled within the power supply circuitry, and the power supply resumes normal operation. In turn, a computer or other load receives full electrical power from the power supply and normal computing (or other) operations can resume. A switch activated by a user can be placed on a front panel or other convenient location of the computer (or other entity).

First Illustrative System

Figure 4:
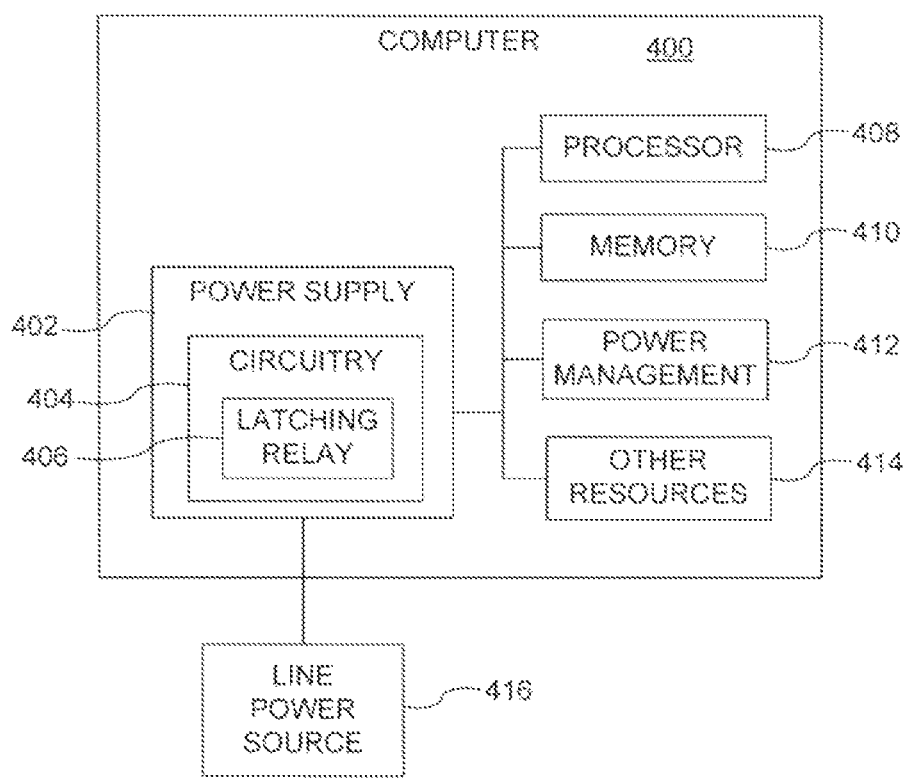
FIG. 4 is a block diagram depicting a computer according to another embodiment.

FIG. 4 is block diagram depicting a computer 400 according to an illustrative and non-limiting embodiment of the present teachings. Numerous other embodiments are contemplated that incorporate the present teachings.

The computer 400 includes a power supply 402. The power supply 402 can be defined by any suitable power supply consistent with the present teachings. In one non-limiting embodiment, the power supply 402 is as defined above with respect to FIG. 1. Other power supplies can also be used. The power supply 402 includes, or is electrically coupled to, circuitry 404 according to the present teachings. The circuitry 404 can be defined by the circuitry 100 as described above. The circuitry 404 includes a latching relay 406 that is controlled by other features of the circuitry 404.

The computer 400 also includes at least one processor 408, memory 410 and power management circuitry 412. The processor 408 and memory 410 are respectively defined as known in the art, and one having ordinary skill in computers and the related arts can appreciate that no further elaboration is needed for an understanding of the present teachings. The power management circuitry 412 is configured to provide one or more signals (e.g., "deep standby", "wake", etc.) and operates to control power conservation within the computer 400.

The computer 400 also includes other resources 414. Non-limiting examples of such other resources 414 include mass storage, a display or monitor, a keyboard, a mouse, network communications circuitry, etc. One having ordinary skill in the computing arts can appreciate that numerous resources can be included as needed or desired, and that further elaboration is not required for an understanding of the present teachings. The computer 400 is coupled to a line power source (i.e., utility power) 416.

Normal illustrative and non-limiting operations of the computer 400 are as follows: the computer 400 operates by way of electrical energy provided by power supply 402. Eventually, it is desired for the computer 400 to enter a power conserving deep standby operating mode. At such time, the power management circuitry 412 issues a deep standby signal to circuitry 404. Such a deep standby signal can, for example, be a ground-potential signal provided at a node 174 of circuitry 100.

In response to the deep standby signal, the circuitry 404 causes a reset (or open switch) condition of the latching relay 406. In turn, the open contacts of the latching relay 406 enables a de-energized state of the power supply 402. As an overall result, electrical power is no longer provided from the power supply 402 to the balance of the computer 400. However, the power management circuitry is assumed to stay energized during deep standby by way of a battery power source, a micro-wattage power supply, or other electrical source (not shown).

At some future time, it is desired for the computer to return to a normal operating state. Thus, a wake signal is issued from the power management circuitry 412 to the circuitry 404. Such a wake signal can, for example, be a ground-potential signal provided at a node 172 of circuitry 100.

In response to the wake signal, the circuitry 404 causes a set (or closed switch) condition of the latching relay 406. The closed contacts of the latching relay 406 allows the power supply 402 to return to a fully operational state. As a result, electrical power is once again enabled from the power supply 402 to the balance of the computer 400. The computer 400 can now be operated and used as normal.

In general, the foregoing description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

What is claimed is:

1. An electronic circuit, comprising:
   a latching relay including a set coil and a reset coil and a switch, the switch having a first end node and a second end node;
   a first capacitor electrically coupled to the first end node of the switch;
   a second capacitor electrically coupled to the second end node of the switch; and
   a rectifier electrically coupled to the first and second capacitors to receive electrical current by way of the first and second capacitors, and electrically coupled to a first output node and a second output node to provide an electrical potential between the first output node and the second output node, in response to the latching relay being in a reset condition.

2. The electronic circuit according to claim 1 further comprising:
   a first resistor connected in series circuit arrangement between the first capacitor and the first end node of the switch; and
   a second resistor connected in series circuit arrangement between the second capacitor and the second end node of the switch.

3. The electronic circuit according to claim 1 further comprising a zener diode electrically coupled between the first and second output nodes.

4. The electronic circuit according to claim 1, wherein the switch is selectively electrically coupled to a power supply circuit to selectively couple electrical current within the power supply circuit between the first and second end nodes in response to the latching relay being in a set condition.

5. The electronic circuit according to claim 1, wherein the first and second output nodes are selectively coupled to a source of electrical potential other than the first and second capacitors, in response to the latching relay being in a set condition.

6. The electronic circuit according to claim 5, the source of electrical potential being a power supply electrically coupled to the latching relay.

7. The electronic circuit according to claim 1 further comprising a manual switch electrically coupled in series with the first and second output nodes and the set coil, to selectively enable the set coil to receive electrical current from the first and second output nodes by way of the manual switch.

8. The electronic circuit according to claim 1 further comprising a manual switch electrically coupled in series with the first and second output nodes and the reset coil, to selectively enable the reset coil to receive electrical current from the first and second output nodes by way of the manual switch.

9. The electronic circuit according to claim 1 further comprising a signal node configured to selectively receive a wake signal, wherein the wake signal is to selectively complete an electrical current path through the set coil, to receive electrical current via the electrical current path including the first output node and the signal node.

10. The electronic circuit according to claim 1 further comprising a signal node configured to selectively receive a deep standby signal, wherein the deep standby signal is to selectively complete an electrical current path through the reset coil, to receive electrical current via the electrical current path including the first output node and the signal node.

11. The electronic circuit according to claim 1, wherein the latching relay is to selectively actuate the switch, responsive to the latching relay being in a set condition, to electrically couple the first end node to the second end node to prevent the rectifier from receiving electrical energy from the first end node and the second end node by way of the first and second capacitors when the latching relay is in the set condition.

12. The electronic circuit according to claim 1, wherein the latching relay being in the reset condition corresponds to the switch being in an electrically open state relative to the first and second end nodes, and wherein the latching relay being in a set condition corresponds to the switch being in an electrically closed state relative to the first and second end nodes.

13. A method, comprising:
   receiving an electrical potential at a rectifier, by way of a first capacitor and a second capacitor, wherein the electrical potential is obtained from respective first and second end nodes of a switch that is in an open state, and wherein the switch is part of a latching relay;
   outputting an electrical potential between a first output node and a second output node of the rectifier;
   selectively coupling electrical current from the first and second output nodes to a set coil of the latching relay in response to assertion of a wake signal; and
   closing the switch by way of the set coil.

14. The method according to claim 13 further comprising selectively coupling electrical current within a power supply between the respective first and second end nodes of the switch in response to the switch being in a closed state.

15. The method according to claim 13 further comprising:
   selectively coupling electrical current from a power supply to a reset coil of the latching relay in response to assertion of a deep standby signal; and
   opening the switch by way of the reset coil.

* * * * *